(12) United States Patent
Anderson

(10) Patent No.: US 7,028,817 B1
(45) Date of Patent: Apr. 18, 2006

(54) PRESSURE ADJUSTABLE SHOCK AND METHOD

(76) Inventor: Randall Charles Anderson, 1860 Cape Ct., Riverside, CA (US) 92506

( * ) Notice: Subject to any disclaimer, the term of this patent is extended or adjusted under 35 U.S.C. 154(b) by 0 days.

(21) Appl. No.: 11/155,907

(22) Filed: Jun. 17, 2005

(51) Int. Cl.
*F16F 9/00* (2006.01)

(52) U.S. Cl. .............................. 188/322.19; 188/322.17

(58) Field of Classification Search ............. 267/64.28; 188/322.21, 321.11, 322.15–322.19, 322.22
See application file for complete search history.

(56) References Cited

U.S. PATENT DOCUMENTS

| | | | | | |
|---|---|---|---|---|---|
| 1,602,539 | A | * | 10/1926 | Mcelroy | 267/64.11 |
| 3,216,332 | A | * | 11/1965 | De Chambeau | 92/5 R |
| 3,549,154 | A | * | 12/1970 | Jones | 277/550 |
| 3,752,461 | A | * | 8/1973 | Gratzmuller | 267/113 |
| 3,843,107 | A | * | 10/1974 | Atkins | 267/64.15 |
| 4,657,228 | A | * | 4/1987 | Lautzenhiser | 267/64.15 |
| 4,735,402 | A | * | 4/1988 | Davis | 267/64.13 |
| 5,098,071 | A | * | 3/1992 | Umetsu | 267/64.27 |
| 5,305,859 | A | * | 4/1994 | Davis | 188/282.1 |
| 5,607,035 | A | * | 3/1997 | Fulks et al. | 188/322.19 |
| 6,820,729 | B1 | * | 11/2004 | Verriet | 188/322.17 |

* cited by examiner

Primary Examiner—Christopher P. Schwartz
(74) Attorney, Agent, or Firm—Aaron Passman

(57) ABSTRACT

A gas pressure adjustable aluminum shock absorber to pressurize oil therein mounts between a vehicle and an axle and includes a threaded aluminum shock body tube, a bore therein an aluminum body mounting loop with an internal female thread to couple in threaded engagement with the threaded aluminum shock body tube for fluid tight connection, an aluminum shaft in the bore extends outwardly, and a damper piston is concentrically atop the aluminum shaft for sliding sealing engagement with the bore. Adjustable flow orifices through the damper piston restrains piston and shaft reciprocation therein and co-acting with hydraulic fluid therein and thereabout. An aluminum seal head internally threaded with an internal female to couple in threaded engagement with the threaded aluminum shock body tube for fluid tight connection and seals in the aluminum seal head to engage the aluminum shaft. A space defined by the bore, the damper piston, the orifices and the aluminum sealing head holds the hydraulic fluid during reciprocation of the aluminum shaft and damper piston relative to the aluminum shock body tube, and a gas injection valve in communicates with the bore for passing and maintaining gas under pressure. A method of making and assembling the pressure adjustable aluminum shock absorber by securing the threaded aluminum shock body tube against expansive deformation with the aluminum body mounting loop and the aluminum seal head each having internal female threads coupled to the threaded aluminum shock body tube for fluid tight connection.

8 Claims, 2 Drawing Sheets

PRESSURE ADJUSTABLE SHOCK AND METHOD

CROSS-REFERENCE TO RELATED APPLICATIONS

None

STATEMENT REGARDING FEDERALLY SPONSORED RESEARCH

Not applicable

SEQUENCE LISTING

Not applicable

BACKGROUND OF THE INVENTION

A suspension system for a vehicle typically includes the use of shock absorbers, shock absorbing struts and/or suspension springs to provide a cushioned ride for the driver and the passengers, if any, of the vehicle. A conventional shock absorber has a chamber filled with hydraulic oil in which a piston connected to a shaft is moved. The viscosity of the oil in the cylinder provides damping for the movement of the piston and shaft relative to the cylinder so that any vibration or bump to either the cylinder or the piston and shaft that result from sudden jolts to the vehicle is modulated.

A second type of shock absorber consists of gas shocks that use pressurized gases for damping the movement of the piston and shaft. Yet a third type of suspension system comprises a combination of both oil and gas. For this type of suspension system, there is provided an external reservoir for the oil that is separate from the shock absorber cylinder. In this reservoir, there is stored, in addition to the oil, a pressurized gas that provides a biasing force against the oil so that, when oil is needed in the cylinder, the oil in the reservoir is forced by the pressurized gas to fill up the cylinder. When under pressure in the cylinder, the excess oil is forced out of the cylinder and stored in the reservoir.

External oil reservoir suspension systems work well but are bulky requiring a large amount of space which may not be available for certain types of vehicles such as for example snowmobiles or race cars. Moreover, due to the need for an extra reservoir and the conduits necessary for connecting the reservoir to the shock absorber, the cost for such system is much higher and therefore could not be justified in most types of vehicles. Furthermore, due to the extra valves and controls that are required to regulate the flow of fluid between the shock absorber and the reservoir, not only is the cost high, the maintenance and reliability for such systems is greater than that required for a typical suspension system. Lastly, the chances of a breakdown for such suspension system are increased due to the additional components and connections required.

SUMMARY OF THE INVENTION

A pressure adjustable aluminum adjustable shock absorber for mounting between a vehicle and an axle has an aluminum shock body tube having an upper male thread and a lower male thread thereabout. A bore within the aluminum shock body tube, has an internal diameter. An aluminum body mounting loop is internally threaded with an internal female thread to couple in threaded engagement with the upper male thread for fluid tight connection therewith. The aluminum body mounting loop is shaped to allow moveable connection to the vehicle. A damper piston fit in sealing engagement with internal diameter of the bore. The aluminum shaft is elongate to extend from within the bore outwardly there from. A damper piston is carried concentrically atop the aluminum shaft for sliding sealing engagement with the bore. Adjustable flow orifices through the damper piston are used to restrain piston and shaft reciprocation within the bore. The adjustable flow orifices co-acting with hydraulic fluid therein and thereabout to restrain reciprocation.

An aluminum seal head is internally threaded into an internal female thread to engage in threaded coupling with the lower male thread for fluid tight connection therewith. The aluminum seal head may have a first internal groove, a second internal groove and a third internal groove each axially disposed in serial depending relation relative to one another beneath the female thread for receiving seals. The first internal groove, the second internal groove and the third internal groove are positioned axially in that order within the aluminum seal head. An o ring is disposed in the first internal groove and is located axially just beneath the female thread. The o ring in combination with first internal groove seals the threaded coupling of the lower male thread and the aluminum seal head. A compression seal in the second internal groove is located axially disposed beneath the o ring to seal the aluminum seal head in sliding contact with the aluminum shaft. A wiper seal in the third internal groove is set axially below the compression seal in sliding contact with the aluminum shaft.

A space is defined by the bore, the damper piston, the orifices and the aluminum sealing head. The space holds the hydraulic fluid during reciprocation of the aluminum shaft and damper piston relative to the aluminum shock body tube. A gas injection valve through the aluminum body mounting loop and into the bore passes and maintains gas under pressure to pressurize the space over the hydraulic fluid. A shaft mounting loop is affixed on the aluminum shaft whereat the aluminum shaft extends from within the bore and through the aluminum seal head outwardly thereof to the shaft mounting loop to allow moveable connection with the axle.

The pressure adjustable aluminum shock absorber of includes a threaded connection between the aluminum shaft and the shaft mounting loop to change the shaft mounting loop. The pressure adjustable aluminum shock absorber has hydraulic fluid that is synthetic oil within the space. The pressure adjustable aluminum shock absorber of has the adjustable flow orifices through the damper piston to restrain piston and shaft reciprocation within the bore. The adjustable flow orifices include shim washers sized with thicknesses and outside and inside diameters selected to cover at least part of the adjustable flow orifices for co-acting and resisting flow of hydraulic fluid therein and thereabout.

Lightweight aluminum shock body tube is an anodized aluminum shock body tube, aluminum damper piston support shaft for the aluminum shaft mounting loop. The shaft mounting loop contains a mounting bushing 34 for moveable attachment to a vehicle chassis. A pressure adjustable aluminum shock absorber provides low unsprung weight and thermal conductivity for improved shock absorber operation. The aluminum shock body tube with an aluminum body mounting loop at the top and an aluminum seal head at the bottom restrains diametrical expansion of the light weight anodized aluminum shock body tube. Prior shock body tubes were steel tubes because skilled artisans did not know how to retain aluminum tube to secure against radial expansion under static and dynamic heat and pressure resulting from loadings.

A special high performance pressure adjustable aluminum shock absorber damper for easily modifying a vehicle suspension system extends the pressure adjustable aluminum shock absorber damper length and stiffness to adapt to particular requirements of a vehicle to improve handling and riding conditions in relation to off road terrain. This result is accomplished by having an easily accessible gas adjustable cylinder for altering the pressure adjustable aluminum shock absorber damper length with an aluminum shock body tube enclosing a damper piston. The aluminum shock body tube reciprocates along a line and relative to an aluminum shaft of the pressure adjustable aluminum shock absorber damper so that aluminum shaft movement is transmitted to the aluminum damper piston. The gas captured within the aluminum shock body tube in a bore therein and above the damper piston is compressed by upward movement of the aluminum shaft. Adding compressed gas up to 300 pounds per square inch via an gas injection valve mounted to pass through aluminum body mounting loop and communicate with the bore gas increases the overall length of the pressure adjustable aluminum shock absorber when affixed to a suspension system. Adding gas adjusts the pressure within the bore and against the damper piston. Length of the pressure adjustable aluminum shock absorber can be changed by simply increasing or decreasing the gas pressure within the aluminum shock body bore. The damper piston located in bore atop the aluminum shaft shifts the pressure adjustable aluminum shock absorber shaft mount loop relative to the aluminum shock body tube body mounting loop. It is preferred that the body mounting loop be attached to the chassis and the shaft mounting loop connect to the axle. Ordinary mounting bushing are shown but skilled artisans will understand that any moveable connection is acceptable.

The pressure adjustable aluminum shock absorber may have any conventional oil metering damper piston sliding within the bore between two sealed chambers. A upper chamber above the damper piston contains a damping fluid with pressurized air (any gas that is inert such as nitrogen could replace the air) to resist the upward movement in the bore of the sliding damper piston. A lower annular chamber resides beneath the damper piston between the bore and the aluminum shock body tube. One or more orifices pass through the damper piston to control the flow of the damping fluid between the chambers. The damper piston is help to the top of the aluminum shaft with a bolt which also secures a plurality of washers stacked above and below the damper piston and in covering relation to the one or more orifices to restrict oil flow as desired. While oil is referred to as the damping fluid it is recognized that gas may to some degree become entrained within the oil and the pressure adjustable aluminum shock absorber will still damp oscillations of the aluminum shaft relative to the body mounting loop.

The aluminum shock body tube provides good thermal conductivity and light weight. At each end of the aluminum shock body tube are the body mounting loop at the top and the seal head at the bottom; those are both preferably made of aluminum. Each is preferably threaded about the outside of the aluminum shock body tube so as to enclose the bore at the top and seal the aluminum shaft at the bottom of the aluminum shock body tube. The aluminum seal head allows the aluminum shaft to slide through and against a wiper head seal and above that a compression head seal each retained within an inwardly facing annular groove within the aluminum seal head. Thus the aluminum seal head and it wiper seal and compression seal circumscribe the aluminum shaft allowing reciprocal movement there through. The shaft mounting loop at the bottom of the aluminum shaft is connected by threaded engagement there between but any secure form of connection such as swaging the shaft mounting loop or cross bolting could be used. The axle is not shown but the mounting bushing is a conventional axle connection permitting some relative rotary movement.

Gas is captured over the oil within the aluminum shock body tube between the bore between the aluminum shock body tube damper piston and the aluminum body mounting loop screwed about the upper threads of the aluminum shock body tube. The aluminum shock body tube damper piston includes seals that slide against the shock body tube bore and retain the captured oil and gas therein. A valve, preferably an injection valve with a plunger or a tire fill valve, a Schrader valve, is located through the aluminum body mounting loop extending from outside the pressure adjustable aluminum shock absorber to the bore therein permits gas to be delivered for pressurizing the oil in the bore between the aluminum body mounting loop and the damper piston and in the annular space defined by the damper piston about the aluminum shaft above the seal head thread engagement with the lower aluminum shock body tube. An O ring sits beneath the threads on the aluminum shock body tube and a first internal groove in the aluminum seal head.

Thus the aluminum shock body tube is circumscribed by the aluminum body mounting loop and the aluminum seal head to assist in restraining the aluminum shock body tube from radial, diametrical expansion under pressure and heat from the compression of captured gas above oil there within attributable to the reciprocating the shock body tube damper piston. The relationship of pressure, volume and temperature are well known as are the modulus of elasticity and coefficient of thermal expansion for aluminum. Those physical laws and material characteristics would act together to cause failure of the aluminum shock body tube if it were not restrained from expansion by the surrounding containment of the aluminum body mounting loop and the aluminum seal head so radial, diametrical expansion due to high static force or dynamic fatigue under cycling pressure and heat.

Preferably, aluminum body mounting loop and the aluminum seal head are each internally threaded with female threads to receive complimentary mating male threads located about the respective ends of the aluminum shock body tube. An O ring at the bottom and a cut ring at the top are used to seal aluminum body mounting loop and the aluminum seal head, respectively. Any other thread sealing as used for high pressure plumbing connections would be an acceptable substitute.

The stroke of the damper piston and the overall length of the pressure adjustable aluminum shock absorber can be altered by merely increasing the gas pressure above the oil in the aluminum shock body tube. Lengthening of the pressure adjustable aluminum shock absorber moves the vehicle upward away from the axle and stiffens the ride. Shortening of the available stroke distance of the pressure adjustable aluminum shock absorber damper piston lowers the distance between axle and chassis and softens the ride. Selection of and resultant firmness and length of the pressure adjustable aluminum shock absorber are as simple as filling a tire and will depend on the specific use of the vehicle involved.

A method of making and assembling a pressure adjustable aluminum shock absorber for mounting between a vehicle and an axle has steps of making and assembling. The step of preparing an aluminum shock body tube having an upper male thread and a lower male thread thereabout is performed. The step of including a bore having an internal diameter within the aluminum shock body tube is followed. The step of internally threading an aluminum body mounting loop with an internal female thread to couple in threaded engagement with the upper male thread for fluid tight connection therewith is used. The step of shaping the aluminum body mounting loop to allow moveable connection to the vehicle is provided. The steps of having a damper piston fit in sealing engagement with internal diameter of the bore and, extending the aluminum shaft from within the bore outwardly there from is performed.

The step of carrying a damper piston concentrically atop the aluminum shaft for sliding sealing engagement with the bore is followed. The steps of providing adjustable flow orifices through the damper piston to restrain piston and shaft reciprocation within the bore and, co-acting with hydraulic fluid therein and thereabout with the adjustable flow orifices is used. The steps of internally threading an aluminum seal head with an internal female thread for engaging in threaded coupling with the lower male thread for fluid tight connection therewith and, having the aluminum seal head include a first internal groove, a second internal groove and a third internal groove axially disposed in serial depending relation relative to one another beneath the female thread for receiving seals, the first internal groove, the second internal groove and the third internal groove positioned axially in that order within the aluminum seal head. The step of disposing an O ring in the first internal groove just beneath the female thread and for in combination therewith sealing the threaded coupling of the lower male thread and the aluminum seal head is employed. The step of locating a compression seal in the second internal groove axially disposed beneath the O ring to seal the aluminum seal head in sliding contact with the aluminum shaft is followed. The step of setting a wiper seal in the third internal groove axially below the compression seal in sliding contact with the aluminum shaft is performed.

The step of defining a space by the bore, the damper piston, the orifices and the aluminum sealing head, holding in the space hydraulic fluid during reciprocation of the aluminum shaft and damper piston relative to the aluminum shock body tube is preferred. The steps of including a gas injection valve through the aluminum body mounting loop and into the bore for passing and maintaining gas under pressure to pressurize the space over the hydraulic fluid, and affixing a shaft mounting loop on the aluminum shaft whereat the aluminum shaft extends from within the bore, through the aluminum seal head outwardly thereof to the shaft mounting loop to allow moveable connection with axle is next. Including the step of making a threaded connection between the aluminum shaft and the shaft mounting loop to change the shaft mounting loop is followed. Having the step of using synthetic oil as the hydraulic fluid is within the space gives good performance. Including shim washers sized with thicknesses and outside and inside diameters selected to cover at least part of the adjustable flow orifices for co-acting with hydraulic fluid therein and thereabout restricts flow through the adjustable flow orifices through the damper piston to restrain piston and shaft reciprocation within the bore.

DETAILED DESCRIPTION

Walker Evans Racing of Riverside, Calif. makes pressure adjustable aluminum shock absorber 10 as described herein and each has an aluminum shock body tube 11. Those pressure adjustable aluminum shock absorbers 10 are designed for off road and snow mobile use. Adjustable ride control by gas pressurization within the aluminum shock body tube 11 allows the gas over oil pressure adjustment for individual needs. The pressure adjustable aluminum shock absorbers 10 includes heat treated valves combined with highly efficient concave damper pistons made from anodized aluminum for long, reliable service life. Synthetic shock oil is specially stabilized for consistent operation even in hot or cold weather.

Figure 1:
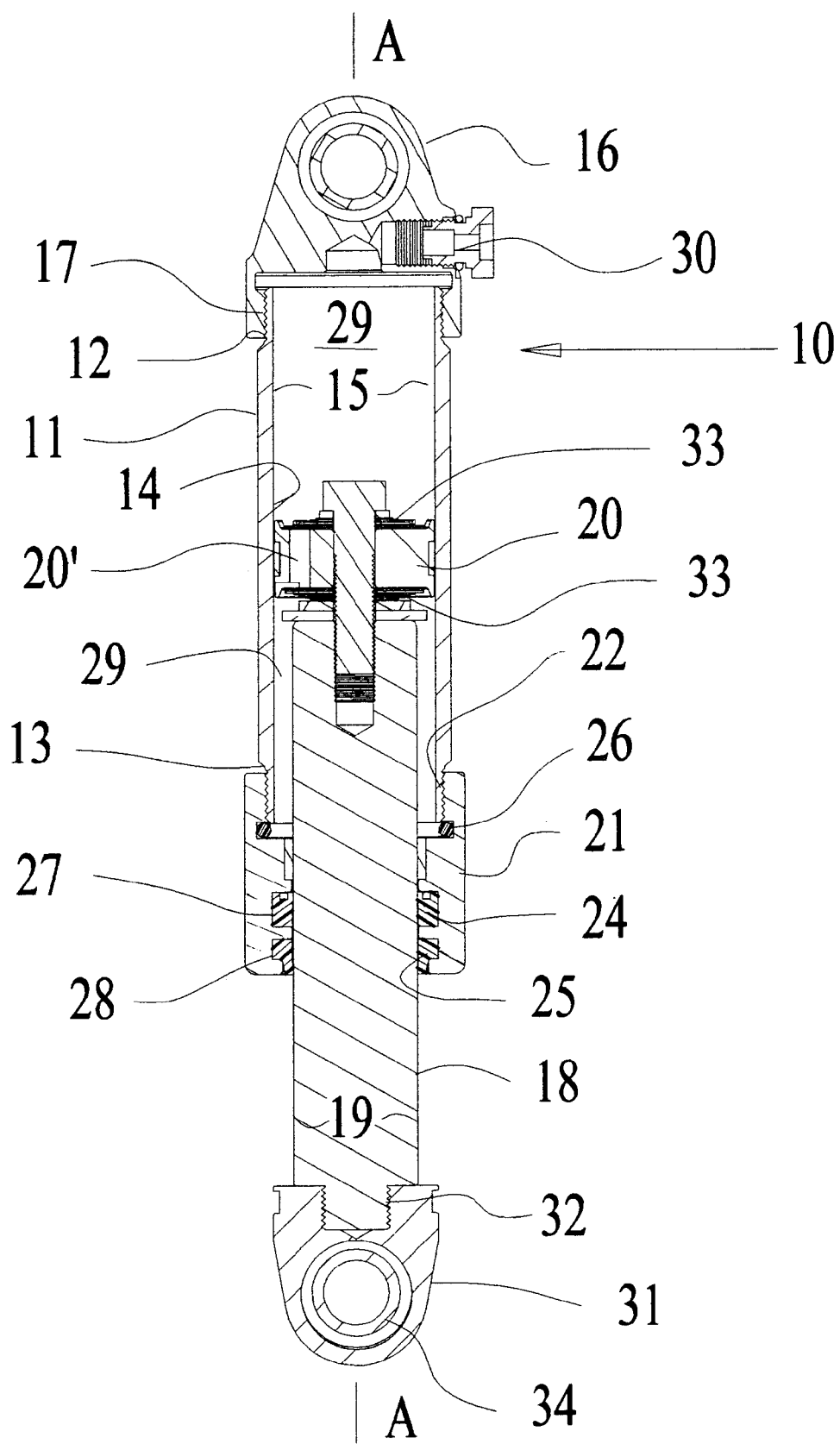
FIG. 1 is a side elevation view in cross section of a pressure adjustable aluminum shock absorber.
Figure 2:
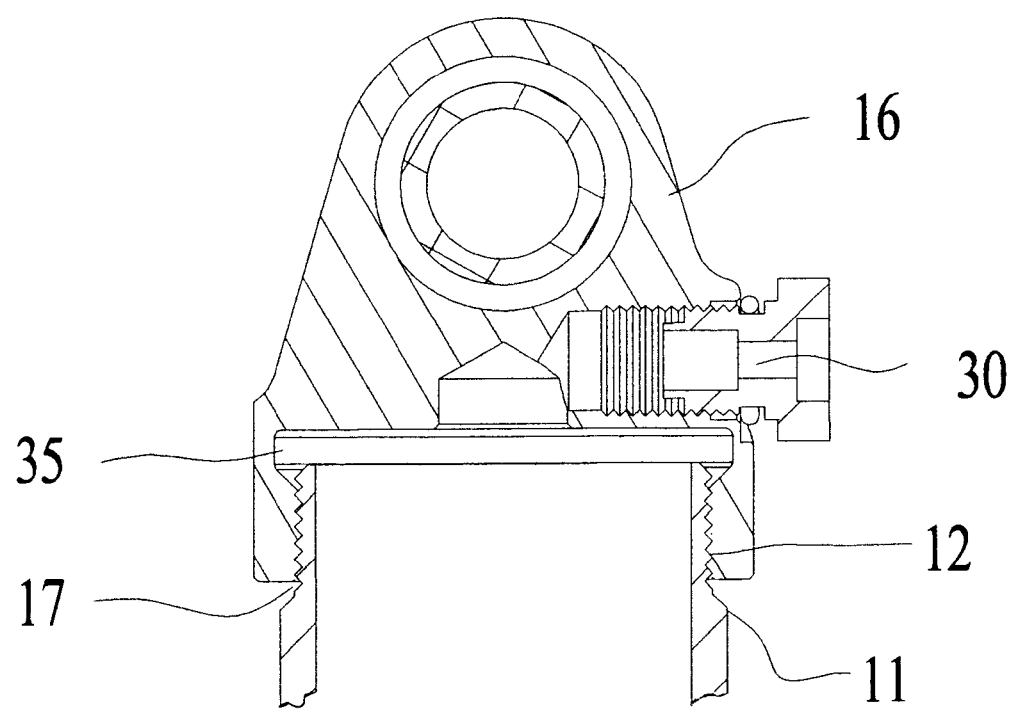
FIG. 2 is an enlarged partial side view in cross section of the aluminum body mounting loop and its engagement to the upper aluminum shock body tube of a pressure adjustable aluminum shock absorber.

Pressure adjustable aluminum shock absorber 10, for mounting between a vehicle and an axle (not shown), has aluminum shock body tube 11 having an upper male thread 12 and a lower male thread 13 thereabout. Upper and lower are relative terms with respect to the positioning of pressure adjustable aluminum shock absorber 10 as shown in FIG. 1 a side elevation view in cross section of pressure adjustable aluminum shock absorber 10. A bore 14 within the aluminum shock body tube 11, has an internal diameter 15. An aluminum body mounting loop 16 is internally threaded with an internal female thread 17 to couple in treaded engagement with upper male thread 12 for fluid tight connection therewith. FIG. 2 is an enlarged side view in cross section of aluminum body mounting loop 16 and its engagement to upper aluminum shock body tube 11 of pressure adjustable aluminum shock absorber 10. The aluminum body mounting loop 16 is shaped to allow moveable connection to the vehicle. An aluminum shaft 18 has preferably a damper piston 18 fit in sealing engagement with internal diameter 15 of the bore 14 see FIGS. 1 and 2. The aluminum shaft 18 is elongate to extend from within the bore 14 outwardly there from. A damper piston 20 is carried concentrically atop the aluminum shaft 18 for sliding sealing engagement with the bore 14. Adjustable flow orifices 20' through damper piston 20 are used to restrain reciprocation within the bore 14 of damper piston 20 and aluminum shaft 18. The adjustable flow orifices 20' co-acting with hydraulic fluid therein and thereabout to restrain reciprocation.

Figure 3:
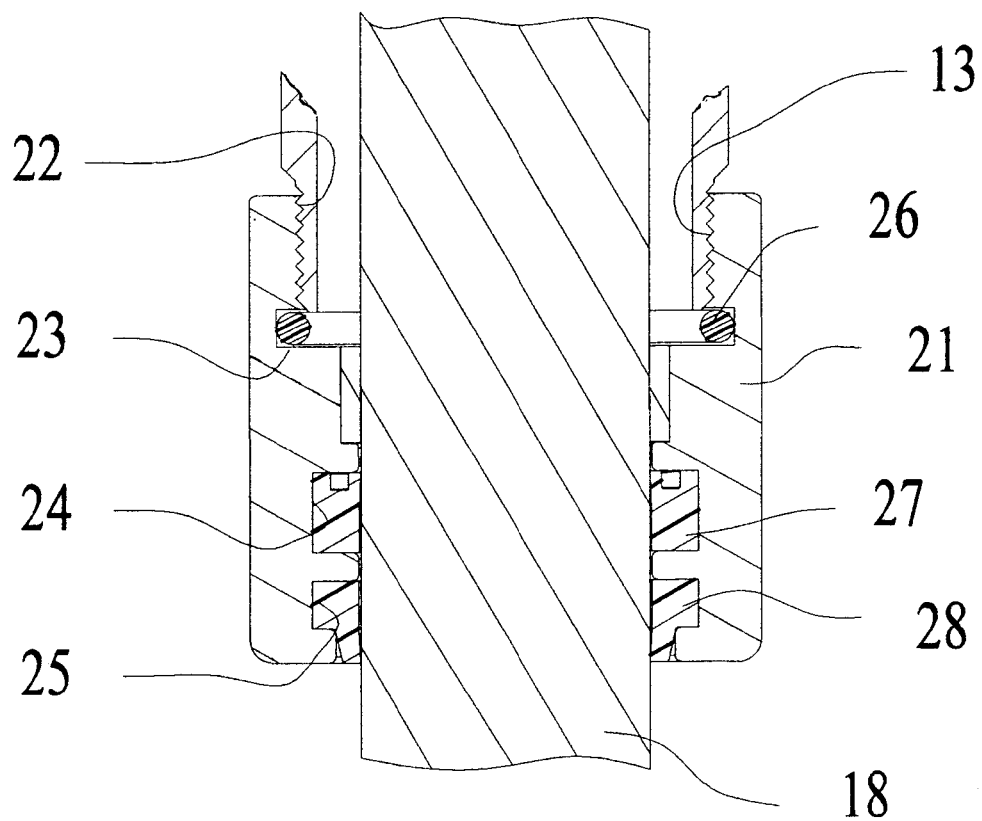
FIG. 3 is an enlarged partial side view in cross section of the aluminum seal head and its engagement to the lower aluminum shock body tube of a pressure adjustable aluminum shock absorber.

An aluminum seal head 21 is internally threaded into an internal female thread 22 to engage in threaded coupling with the lower male thread 13 for fluid tight connection therewith. FIG. 3 is an enlarged side view in cross section of aluminum seal head 21 and its engagement to lower aluminum shock body tube 11 of pressure adjustable aluminum shock absorber 10. Aluminum seal head 21 may have a first internal groove 23, a second internal groove 24 and a third internal groove 25 each axially disposed in serial depending relation relative to one another beneath female thread 22 for receiving seals. First internal groove 23, second internal groove 24 and third internal groove 25 are positioned axially in that order within aluminum seal head 21. An O ring 26 is disposed in first internal groove 23 and is located axially just beneath internal female thread 22. O ring 26 in combination with first internal groove 23 seals the threaded coupling of lower male thread 13 and aluminum seal head 21. A compression seal 27 in second internal groove 24 is located axially disposed beneath O ring 26 to seal aluminum seal head 21 in sliding contact with aluminum shaft 18. A wiper seal 28 in third internal groove 25 is set axially below compression seal 27 in sliding contact with aluminum shaft 18.

A space 29 is defined by bore 14, damper piston 20, orifices 20' and aluminum seal head 21, see FIG. 1. Space 29 holds the hydraulic fluid during reciprocation of the aluminum shaft 18 and damper piston 20 relative to the aluminum shock body tube 11. A gas injection valve 30 through aluminum body mounting loop 16 and into bore 14 passes and maintains gas under pressure to pressurize space 29 particularly over the hydraulic fluid. Aluminum shaft 18 mounting loop 31 is affixed on the aluminum shaft 18 whereat aluminum shaft 18 extends from within bore 14 and through aluminum seal head 21 outwardly thereof to aluminum shaft 18 mounting loop 31 to allow moveable connection with the axle.

Pressure adjustable aluminum shock absorber 10 includes a threaded connection 32 between aluminum shaft 18 and mounting loop 31 to change aluminum shaft 18 mounting loop 31. Pressure adjustable aluminum shock absorber 10 has hydraulic fluid that is synthetic oil within the space 29. Pressure adjustable aluminum shock absorber 10 of has adjustable flow orifices 20' through damper piston 20 to restrain it and aluminum shaft 18 reciprocation within bore 14. Adjustable flow orifices 20' include shim washers 33 sized with thicknesses and outside and inside diameters selected to cover at least part of adjustable flow orifices 20' for co-acting and resisting flow of hydraulic fluid therein and thereabout.

Lightweight aluminum shock body tube 11 is anodized aluminum, aluminum damper piston 20 support aluminum shaft 18 for the aluminum shaft 18 mounting loop 31. Aluminum shaft 18 mounting loop 31 contains a mounting bushing 34 for moveable attachment to a vehicle chassis. Pressure adjustable aluminum shock absorber 10 provides low unsprung weight and thermal conductivity for improved shock absorber operation. Aluminum shock body tube 11 with aluminum body mounting loop 16 at the top and aluminum seal head 21 at the bottom restrains diametrical expansion of the light weight anodized aluminum shock body tube 11. Prior shock body tubes were steel tubes because skilled artisans did not know how to retain aluminum tube to secure against radial expansion under static and dynamic heat and pressure resulting from loadings.

A special high performance pressure adjustable aluminum shock absorber 10 is pressurized by gas for easily modifying a vehicle suspension system extends the pressure adjustable aluminum shock absorber 10 damper length and stiffness to adapt to particular requirements of a vehicle to improve handling and riding conditions in relation to off road terrain. This result is accomplished by having an easily accessible adjustable gas pressurized bore for altering the pressure adjustable aluminum shock absorber 10 damper length within aluminum shock body tube 11 enclosed by damper piston 20. Aluminum shock body tube 11 reciprocates along axis "A" shown in FIG. 1 and is in line with aluminum shaft 18 of pressure adjustable aluminum shock absorber 10 damper so that aluminum shaft 18 movement is transmitted to aluminum damper piston 20. The gas captured within aluminum shock body tube 11 in bore 14 therein and above damper piston 20 is compressed by upward movement of aluminum shaft 18. Adding compressed gas preferably air up to 300 pounds per square inch via an gas injection valve 30 mounted to pass through aluminum body mounting loop 16 and communicate with bore 14 gas increases the overall length of pressure adjustable aluminum shock absorber 10 when affixed to a suspension system. Adding gas pressurization adjusts the pressure within bore 14 and against damper piston 20 lengthens pressure adjustable aluminum shock absorber 10 with changes by simply increasing or decreasing the gas pressure within aluminum shock bore 14. Damper piston 20 located in bore 14 atop aluminum shaft 18 shifts pressure adjustable aluminum shock absorber 10 aluminum shaft 18 mounting loop 31 relative to aluminum shock body tube 11 body mounting loop 16. Body mounting loop 16 is attached to the chassis and aluminum shaft 18 mounting loop 31 connects to the axle. Ordinary mounting bushings 34 on body mounting loop 16 and mounting loop 31 are shown in FIGS. 2 and 3 but skilled artisans will understand that any typical an moveable shock absorber connection is acceptable.

Pressure adjustable aluminum shock absorber 10 may have any conventional oil metering damper piston 20 sliding within bore 14. Damper piston 20 resides in hydraulic fluid such as synthetic oil with pressurized gas (any gas that is inert such as nitrogen could replace the air) to resist the upward movement in bore 14 of the sliding damper piston 20. Beneath damper piston 20 above seal head 21 and within bore 14 of aluminum shock body tube 11 hydraulic oil is compressed in space 29 with downward movement of aluminum shaft 18. One or more orifices 20' pass through the damper piston 20 to control the flow of the damping fluid between the chambers. Damper piston 20 is held to the top of the aluminum shaft 18 with a bolt 18', see FIG. 1 which also secures a plurality of shim washers 33 stacked above and below the damper piston 20 and in somewhat covering relation to the one or more orifices 20' to restrict oil flow as desired. While oil is referred to as the damping fluid it is recognized that gas may to some degree become entrained within the oil but pressure adjustable aluminum shock absorber 10 will still damp oscillations of the aluminum shaft 18 relative to the body mounting loop 16.

The aluminum shock body tube 11 provides good thermal conductivity and light weight. At each end of the aluminum shock body tube 11 are body mounting loop 16 at the top and seal head 21 at the bottom; those are both preferably made of anodized aluminum; they may be colored and faceted to enhance appearance and ease assembly with a wrench or spanner. Both are preferably threaded about the outside of aluminum shock body tube 11 so as to enclose bore 14 at the top and seal aluminum shaft 18 at the bottom of the aluminum shock body tube 11. Aluminum seal head 21 allows the aluminum shaft 18 to slide through and against wiper seal 29 and above that compression head seal 28 where each is retained within groove 24 that is inwardly facing and annular within aluminum seal head 21. Thus aluminum seal head 21 and with wiper seal 29 and compression seal 28 circumscribe aluminum shaft 18 allowing reciprocal movement there through. Aluminum shaft 18 mounting loop 31 at the bottom of the aluminum shaft 18 is connected by threaded engagement there between but any secure form of threaded connection 32 or swaging of aluminum shaft 18 mounting loop 31 or cross bolting could be used. The axle is not shown because mounting bushing 34 is a conventional axle connection permitting some relative rotary movement.

Gas is captured over the oil within aluminum shock body tube 11 between bore 14 between aluminum shock body tube 11, damper piston 20 and aluminum body mounting loop 16 screwed about upper male threads 12 of the aluminum shock body tube 11. Aluminum shock body tube 11 with damper piston 20 seals and slide against the shock body tube 11 bore 14 and retains captured oil and air or gas therein. Gas injection valve 30, with a plunger or septum likewise a tire fill valve (Schrader valve), is located through the aluminum body mounting loop 16 extending from outside the pressure adjustable aluminum shock absorber 10 passing into bore 14 permitting gas to be delivered for pressurizing the oil in bore 14 between aluminum body mounting loop 16 and damper piston 20 within space 29 that is in part annular below damper piston 20 as defined by damper piston 20 about aluminum shaft 18 above aluminum seal head 21 thread engagement with aluminum shock body tube 11. O ring 26 sits beneath lower male threads 13 on aluminum shock body tube 11 and within first internal groove 23 in aluminum seal head 21.

Thus aluminum shock body tube 11 is circumscribed at the top and the bottom by aluminum body mounting loop 16 and aluminum seal head 21, respectively to assist in restraining aluminum shock body tube 11 from radial, diametrical expansion under static or dynamic pressure and heat from the compression of captured gas above oil there within attributable to the reciprocating within shock body tube 11 by damper piston 20. The relationship of pressure, volume and temperature are well known as are the modulus of elasticity and coefficient of thermal expansion for aluminum. Those physical laws and material characteristics would act together to cause failure of aluminum shock body tube 11 if it were not restrained from expansion by the surrounding containment of aluminum body mounting loop 16 and aluminum seal head 21. Radial, diametrical expansion due to high static force or dynamic fatigue under cycling pressure and heat are thus overcome.

Aluminum body mounting loop 16 and aluminum seal head 21 are each internally threaded with internal female threads 17 and 22, respectively to receive complimentary mating male threads 12 and 13, respectively. O ring 26 at the bottom and a cut ring 35 at the top seal aluminum seal head 21 and aluminum body mounting loop 16, respectively. Any other thread sealing as used for high pressure plumbing connections would be an acceptable substitute.

The stroke of damper piston 20 and the overall length of the pressure adjustable aluminum shock absorber 10 can be altered by merely increasing the gas pressure above the oil in the aluminum shock body tube 11. Lengthening of pressure adjustable aluminum shock absorber 10 moves the vehicle upward away from the axle and stiffens the ride. Shortening of the available stroke distance of the pressure adjustable aluminum shock absorber 10 damper piston 20 lowers the distance between axle and chassis and softens the ride. Selection of and resultant firmness and length of pressure adjustable aluminum shock absorber 10 are as simple as filling a tire and will depend on the specific use of the vehicle involved.

A method of making and assembling pressure adjustable aluminum shock absorber 10 for mounting between a vehicle and an axle has steps of making and assembling. The step of preparing aluminum shock body tube 11 having upper male thread 12 and lower male thread 13 thereabout is performed. The step of including bore 14 having internal diameter 15 within aluminum shock body tube 11 is followed. The step of internally threading aluminum body mounting loop 16 with internal female thread 17 to couple in threaded engagement with upper male thread 12 for fluid tight connection therewith is used. The step of shaping aluminum body mounting loop 16 to allow moveable connection to the vehicle is provided. The steps of having damper piston 18 fit in sealing engagement with internal diameter 15 of bore 14 and, extending aluminum shaft 18 from within bore 14 outwardly there from is performed.

The step of carrying damper piston 20 concentrically atop aluminum shaft 18 for sliding sealing engagement with bore 14 is followed. The steps of providing adjustable flow orifices 20' through damper piston 20 to restrain piston 20 and aluminum shaft 18 reciprocation within bore 14 and, co-acting with hydraulic fluid therein and thereabout with the adjustable flow orifices 20' is used. The steps of internally threading aluminum seal head 21 with internal female thread 22 for engaging in threaded coupling with lower male thread 13 for fluid tight connection therewith and, having aluminum seal head 21 include first internal groove 23, second internal groove 24 and third internal groove 25 axially disposed in serial depending relation relative to one another beneath internal female thread 22 for receiving seals so first internal groove 23, second internal groove 24 and third internal groove 25 positioned axially in that order within aluminum seal head 21. The step of disposing O ring 26 in first internal groove 23 just beneath internal female thread 22 and for in combination therewith sealing threaded coupling of lower male thread 13 and aluminum seal head 21 is employed. The step of locating compression seal 28 in second internal groove 24 axially disposed beneath O ring 26 to seal aluminum seal head 21 in sliding contact with aluminum shaft 18 is followed. The step of setting wiper seal 29 in third internal groove 25 axially below compression seal 28 in sliding contact with aluminum shaft 18 is performed.

The step of defining a space 29 by bore 14, damper piston 20, orifices 20' and aluminum sealing head 21, holding in space 29 hydraulic fluid during reciprocation of the aluminum shaft 18 and damper piston 20 relative to aluminum shock body tube 11 is preferred. The steps of including gas injection valve 30 through aluminum body mounting loop 16 and into bore 14 for passing and maintaining gas under pressure to pressurize the space 29 over the hydraulic fluid, and affixing aluminum shaft 18 mounting loop 31 on aluminum shaft 18 whereat aluminum shaft 18 extends from within bore 14, through aluminum seal head 21 outwardly thereof to aluminum shaft 18 mounting loop 31 to allow moveable connection with axle is next. Including the step of making threaded connection 32 between aluminum shaft 18 and aluminum shaft 18 mounting loop 31 to change aluminum shaft 18 mounting loop 31 is followed. Having the step of using synthetic oil as the hydraulic fluid is within space 29 gives good performance. Following the step of including shim washers 33 sized with thicknesses and outside and inside diameters selected to cover at least part of adjustable flow orifices 20' for co-acting with hydraulic fluid therein and thereabout restricts flow through adjustable flow orifices 20' through damper piston 20 to restrain damper piston 20 and aluminum shaft 18 reciprocation within the bore 14.

Although the invention herein has been described with reference to particular embodiments, it is to be understood that these embodiments are merely illustrative of the principles and applications of the present invention. An all aluminum pressure adjustable shock absorber of nay size or type is sought to be protected so long as shock body tube is restrained from expansion by end connections. It is therefore to be understood that numerous modifications may be made to the illustrative embodiments and that other arrangements may be devised without departing from the spirit and scope of the present invention as defined by the appended claims.

The invention claimed is:

1. A pressure adjustable aluminum shock absorber for mounting between a vehicle and an axle, the pressure adjustable aluminum shock absorber comprising:
an aluminum shock body tube having an upper male thread and a lower male thread thereabout;
a bore within the aluminum shock body tube, the bore having an internal diameter;
an aluminum body mounting connection internally threaded with an internal female thread to couple in threaded engagement with the upper male thread for fluid tight connection therewith, the aluminum body mounting connection shaped to allow moveable connection to the vehicle;
a damper piston fit in sealing engagement with internal diameter of the bore, the aluminum shaft elongate to extend from within the bore outwardly there from;
a damper piston carried concentrically atop the aluminum shaft for sliding sealing engagement with the bore;
adjustable flow orifices through the damper piston to restrain piston and shaft reciprocation within the bore, the adjustable flow orifices co-acting with hydraulic fluid therein and thereabout;
an aluminum seal head internally threaded with an internal female thread to engage in threaded coupling with the lower male thread for fluid tight connection therewith, the aluminum seal head having a first internal groove, a second internal groove and a third internal groove axially disposed in serial depending relation relative to one another beneath the female thread for receiving seals, the first internal groove, the second internal groove and the third internal groove positioned axially in that order within the aluminum seal head;
an o ring disposed in the first internal groove just beneath the female thread and for in combination therewith sealing the threaded coupling of the lower male thread and the aluminum seal head;
a compression seal in the second internal groove located axially disposed beneath the o ring to seal the aluminum seal head in sliding contact with the aluminum shaft;
a wiper seal in the third internal groove set axially below the compression seal in sliding contact with the aluminum shaft;
a space defined by the bore, the damper piston, the orifices and the aluminum sealing head, the space for holding the hydraulic fluid during reciprocation of the aluminum shaft and damper piston relative to the aluminum shock body tube;
a gas injection valve through the aluminum body mounting connection and into the bore for passing and maintaining gas under pressure to pressurize the space over the hydraulic fluid, and
a shaft mounting connection affixed on the aluminum shaft whereat the aluminum shaft extends from within the bore, through the aluminum seal head outwardly thereof to the shaft mounting connection to allow moveable connection with axle.

2. The pressure adjustable aluminum shock absorber of claim 1, including a threaded connection between the aluminum shaft and the shaft mounting connection to change the shaft mounting connection.

3. The pressure adjustable aluminum shock absorber of claim 1, in which the hydraulic fluid is synthetic oil within the space.

4. The pressure adjustable aluminum shock absorber of claim 1, wherein the adjustable flow orifices through the damper piston to restrain piston and shaft reciprocation within the bore include shim washers sized with thicknesses and outside and inside diameters selected to cover at least part of the adjustable flow orifices for co-acting and resisting flow of hydraulic fluid therein and thereabout.

5. A method of making and assembling a pressure adjustable aluminum shock absorber for mounting between a vehicle and an axle, the method of making and assembling having the steps of:
preparing an aluminum shock body tube having an upper male thread and a lower male thread thereabout;
including a bore having an internal diameter within the aluminum shock body tube;
internally threading an aluminum body mounting connection with an internal female thread to couple in threaded engagement with the upper male thread for fluid tight connection therewith, shaping the aluminum body mounting connection to allow moveable connection to the vehicle;
having a damper piston fit in sealing engagement with internal diameter of the bore, extending the aluminum shaft from within the bore outwardly there from;
carrying a damper piston concentrically atop the aluminum shaft for sliding sealing engagement with the bore;
providing adjustable flow orifices through the damper piston to restrain piston and shaft reciprocation within the bore, co-acting with hydraulic fluid therein and thereabout with the adjustable flow orifices;
internally threading an aluminum seal head with an internal female thread for engaging in threaded coupling with the lower male thread for fluid tight connection therewith, having the aluminum seal head include a first internal groove, a second internal groove and a third internal groove axially disposed in serial depending relation relative to one another beneath the female thread for receiving seals, the first internal groove, the second internal groove and the third internal groove positioned axially in that order within the aluminum seal head;
disposing an o ring in the first internal groove just beneath the female thread and for in combination therewith sealing the threaded coupling of the lower male thread and the aluminum seal head;
locating a compression seal in the second internal groove axially disposed beneath the o ring to seal the aluminum seal head in sliding contact with the aluminum shaft;
setting a wiper seal in the third internal groove axially below the compression seal in sliding contact with the aluminum shaft;
defining a space by the bore, the damper piston, the orifices and the aluminum sealing head, holding in the space hydraulic fluid during reciprocation of the aluminum shaft and damper piston relative to the aluminum shock body tube;
including a gas injection valve through the aluminum body mounting connection and into the bore for passing and maintaining gas under pressure to pressurize the space over the hydraulic fluid, and
affixing a shaft mounting connection on the aluminum shaft whereat the aluminum shaft extends from within the bore, through the aluminum seal head outwardly thereof to the shaft mounting connection to allow moveable connection with axle.

6. The method of making and assembling having the steps of claim 5, and including the step of making a threaded connection between the aluminum shaft and the shaft mounting connection to change the shaft mounting connection.

7. The method of making and assembling having the steps of claim 5, and having the step of using synthetic oil as the hydraulic fluid is within the space.

8. The method of making and assembling having the steps of claim 5, with the step of including shim washers sized with thicknesses and outside and inside diameters selected to cover at least part of the adjustable flow orifices for co-acting with hydraulic fluid therein and thereabout restricting flow through the adjustable flow orifices through the damper piston to restrain piston and shaft reciprocation within the bore.

* * * * *